US 7,885,973 B2

(12) United States Patent
Sastry et al.

(10) Patent No.: US 7,885,973 B2
(45) Date of Patent: Feb. 8, 2011

(54) COMPUTER METHOD AND APPARATUS FOR PARAMETERIZED SEMANTIC INQUIRY TEMPLATES WITH TYPE ANNOTATIONS

(75) Inventors: Nishanth R. Sastry, Cambridge, MA (US); Steven I. Ross, South Hamilton, MA (US); Daniel M. Gruen, Newton, MA (US); Susanne C. Hupfer, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 12/035,992

(22) Filed: Feb. 22, 2008

(65) Prior Publication Data

US 2009/0216730 A1    Aug. 27, 2009

(51) Int. Cl.
*G06F 17/30* (2006.01)
(52) U.S. Cl. .................. 707/779; 707/739; 707/754; 706/59
(58) Field of Classification Search ............... 707/779, 707/739, 754, E17.098, 999.003, 999.101, 707/999.102, 999.107; 706/55, 59
See application file for complete search history.

(56) References Cited

U.S. PATENT DOCUMENTS

| 5,943,497 | A | 8/1999 | Bohrer et al. |
|---|---|---|---|
| 6,023,578 | A | 2/2000 | Birsan et al. |
| 6,108,635 | A | 8/2000 | Herren et al. |
| 6,609,132 | B1 | 8/2003 | White et al. |
| 6,691,134 | B1 | 2/2004 | Babula et al. |
| 7,130,861 | B2 * | 10/2006 | Bookman et al. ............ 1/1 |
| 7,139,774 | B2 * | 11/2006 | Dettinger et al. ............ 1/1 |
| 7,143,091 | B2 | 11/2006 | Charnock et al. |
| 7,240,330 | B2 | 7/2007 | Fairweather |
| 7,428,555 | B2 | 9/2008 | Yan |
| 7,707,159 | B2 * | 4/2010 | Christianson et al. ............ 1/1 |

(Continued)

OTHER PUBLICATIONS

S-F. Chen, W. Chang, H. Sundaram: Semantic Visual Templates: Linking Visual Features to Semantics. In 1998 International Conference on Image Processing (ICIP'98)—vol. 3, p. 531-535.

(Continued)

*Primary Examiner*—Leslie Wong
(74) *Attorney, Agent, or Firm*—Hamilton, Brook, Smith & Reynolds, P.C.

(57) ABSTRACT

A computer method and system generates inquires. The method and system provide a plurality of templates. Each template outlines a respective inquiry and is associated with one or more semantic types or contexts. Each template has one or more parameters for defining a query instance of the respective inquiry. User input selects a template from the plurality and specifies values for the parameters of the user selected template. Using the user selected template and the user-specified parameter values, an instance of a query is produced. Each template, is associated with semantic types during template construction. The semantic types may be based on classes in an ontology. Template construction may include templatizing prior existing or other queries to create respective templates. In application or use of a template, query generation may be during modeling of a certain domain, and the produced query is for information about the certain domain. Parameter value selection may be automated or assisted by the system based on the model context where the template is instantiated.

19 Claims, 12 Drawing Sheets

U.S. PATENT DOCUMENTS

| | | | |
|---|---|---|---|
| 2002/0059069 | A1 | 5/2002 | Hsu et al. |
| 2003/0101151 | A1 | 5/2003 | Holland |
| 2004/0139107 | A1 | 7/2004 | Bachman et al. |
| 2004/0220893 | A1* | 11/2004 | Spivack et al. ............... 706/46 |
| 2007/0088723 | A1 | 4/2007 | Fish |
| 2008/0154873 | A1 | 6/2008 | Redlich et al. |
| 2008/0162498 | A1* | 7/2008 | Omoigui ..................... 707/10 |
| 2009/0158099 | A1 | 6/2009 | Cui |
| 2009/0248753 | A1 | 10/2009 | Tsai et al. |

OTHER PUBLICATIONS

"Additions to the SQL Server 200 Service Pack 4 readme files", dated Nov. 26, 2007, retrieved from Internet, http://support.microsoft.com/?kbid=884525, 4 pages.

Seaborne, A. and Manjunath, G., "SPARQL/Update: A language for updating RDF graphs," 13 pages, dated Mar. 28, 2007.

IBM alphaWorks, "Semantic Tools for Web Services", dated Jun. 9, 2005, retrieved from Internet, http://www.alphaworks.ibm.com/tech/wssem/, 2 pages.

* cited by examiner

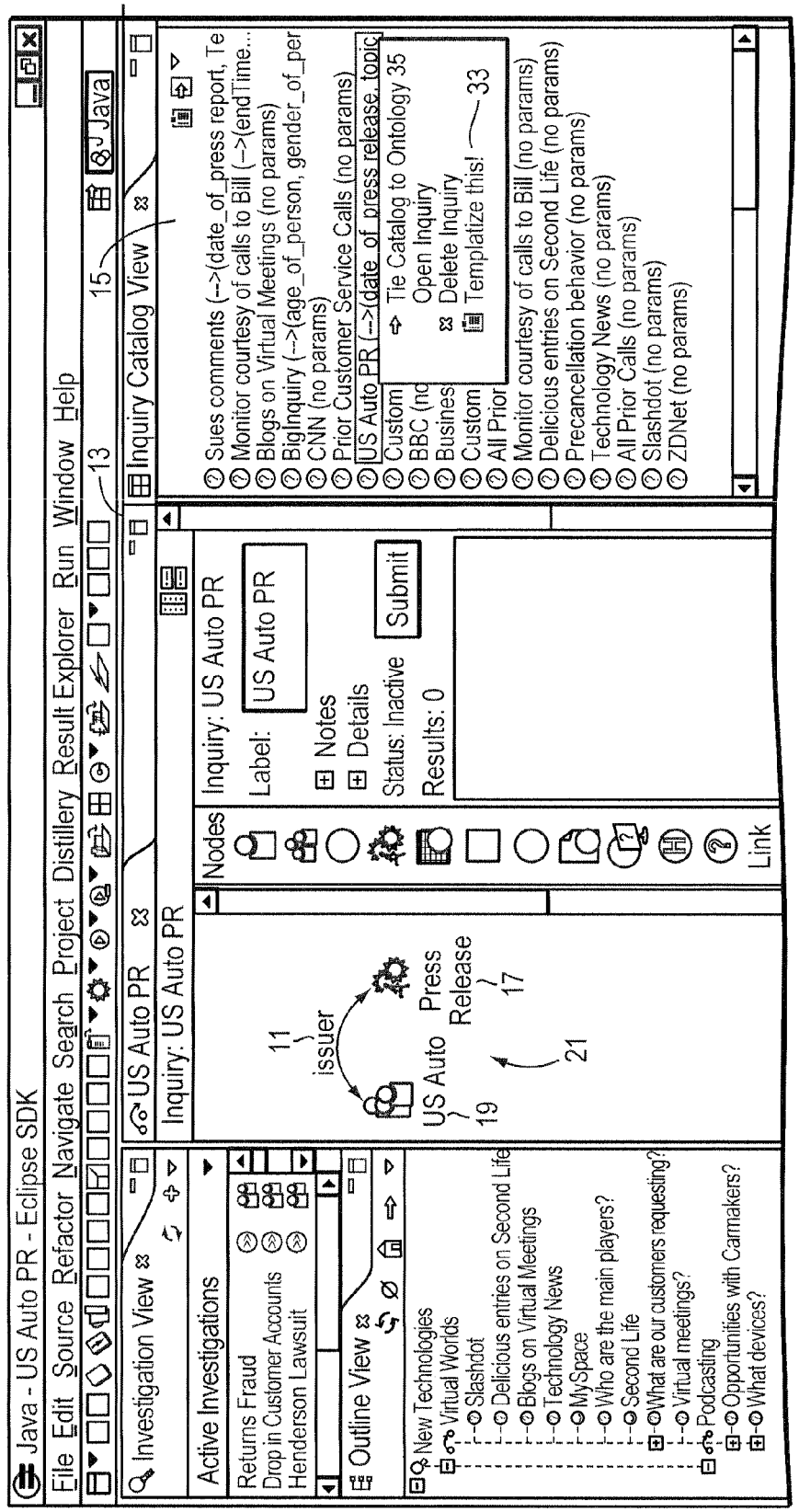

COMPUTER METHOD AND APPARATUS FOR PARAMETERIZED SEMANTIC INQUIRY TEMPLATES WITH TYPE ANNOTATIONS

GOVERNMENT SUPPORT

The invention was made with Government support under Contract No. H98230-07-C-0383 awarded by the U.S. Department of Defense. The Government has certain rights to this invention.

RELATED APPLICATIONS

The following patent applications by assignee disclose related subject matter to that of the present invention:
- U.S. patent application Ser. No. 11/867,890, entitled "A Method and Apparatus for Providing On-Demand Ontology Creation and Extension";
- U.S. patent application Ser. No. 12/017,987, entitled "Computer Method and Apparatus for Graphical Inquiry Specification with Progressive Summary"; and
- U.S. patent application Ser. No. 12/017,990, entitled "Computer Method and System for Contexual Management and Awareness of Persistent Queries and Results."

Each of the foregoing in its entirety is herein incorporated by reference

BACKGROUND OF THE INVENTION

Many areas including Investigative Analysis and Business Intelligence gathering involve the construction of complex models of a problem domain, and the creation of inquiries for new information about the domain being investigated. Constructing such inquiries can often be difficult and disruptive to the process of modeling the problem domain. Because constructing new inquiries from scratch can be difficult, investigators often attempt to construct new inquiries by copying similar inquiries from previous models and modifying them to suit the current investigation context. However, the process of locating an appropriate old inquiry to copy, and determining which aspects of the old inquiry need to be changed to suit the current investigation, can itself be disruptive to the modeling process.

Templates are a common solution in other situations where old items are copied to create new instances. Just as illustration, Microsoft SQL server ships with a catalog of a few dozen templates for common types of SQL queries. A user creating a new SQL query can simplify the task by building upon an existing template. Similarly, many email clients allow the creation of templates for common types of emails, where only a few things, such as the name of the recipient and their email address needs to be changed. In this standard notion of templates, the template can typically be thought of as a string with parameters (this is also a frequently used implementation strategy); which must be changed to suit the context in which the template is being used.

Typically, templating involves a two-stage process of creation and use. In the first step, a concrete instance of an item is taken as the basis for creating a template by generalizing some of its aspects by parameterizing them. This is notated:
  Template creation: Concrete item A→Template (formed by generalizing some aspects of A as "parameters" in the template)

Templates created in this way are stored in a catalog.

In the second step, a template is chosen from the catalog and a new item is created from the chosen template by associating concrete values with the parameters:
  Template use: Template→new concrete item B (formed by associating new values for the template's parameters)

In situations where the task of choosing and applying a template is a first class activity that is not subordinate to another higher-level activity, this simplistic model of templates may be adequate. For instance, for a user who wants to send out a mass email of a certain type, choosing which email template to apply is the most important activity in the context. Similarly, in some situations, such as creating a new table, choosing the SQL template to apply is the most important activity. In other cases, such as choosing an appropriate SQL query to run to retrieve data relevant to a business problem, stopping to choose the appropriate SQL template to apply for the query can be a distraction from focusing on the business problem at hand.

When choosing a template is a subordinate activity to a higher-level activity that also demands the attention of the user, the number of inquiries and templates in the catalog can quickly get out of hand. In Applicants' situation, searching for the appropriate template to use in the context of the model can itself disrupt the modelling process the modeller is carrying out. Furthermore, even if an appropriate template is found, applying it involves replacing the parameters of the templated inquiry. These are typically low-level attributes of the objects being modelled; thus the modeller will have to typically switch context yet again to figure out the values to associate with the parameters.

Three examples of related art are as follows.

SPRAUL: The SPARQL update language is defined by HP Labs and specifies changes to an RDF graph as templates of other RDF graphs. This looks and feels a lot like SQL, and is too low-level for the purposes of modellers. This involves thinking about the model in terms of RDF whereas Applicants allow modellers to think in terms of a graphical and English-like textual representation. Furthermore, semantic type information is not well exploited to suggest possible templates to apply in any given context. See <jena.hpl.hp.com/.about.afs/SPARQL-Update.html> for a brief summary or <www.hpl.hp.com/techreports/2007/HPL-2007-102.pdf>, for a full report.

S-F. Chen, W. Chang, H. Sundaram, "Semantic visual templates: linking visual features to semantics" in 1998 International Conference on Image Processing (ICIP '98)—Volume 3 p. 531, or <ieeexplore.ieee.org/xpls/abs_all.jsp?arnumber=727321> is another example. This paper uses semantic annotations to retrieve images. In this way, they are arguably superficially similar to Applicants' method of retrieving templates appropriate to the modeling context. However, they do not exploit type hierarchy information; and also, their application does not require the second step of applying the template in the context of a model, where Applicants further use object-level information to automatically fill in parameters.

IBM Semantic Tools for Web Services at <www.alphaworks.ibm.com/tech/wssem/> includes functionality for adding semantic annotations and matching between Web Service Interfaces that have different names but have compatible annotations. This is similar to Applicants' method for matching applicable templates given a modeling context, but should be more appropriately compared to matching two different templates based on their annotation. This technology for matching can be profitably used in conjunction with Applicants' invention to compose two different inquiries together into a more complex inquiry.

SUMMARY OF THE INVENTION

To address the needs and limitations described above, Applicants propose a system having:

1. inquiry templates in which the parameters that can be filled in are semantically described by reference to classes and properties within an ontology (for example);
2. a mechanism for associating the templates with additional classes to which they can apply;
3. a mechanism to easily convert an existing inquiry to a template by indicating which parameters can be replaced by other instances of the same class, a superclass, etc.;
4. a mechanism for offering up inquiry templates relevant to a selected item or set of items based on their classes and/or the relationships between them; and
5. a mechanism for semi-automatically setting the parameters of a template to reflect the selected instances or set of instances (with the ability for user input on this) to which the template is being applied.

With the present innovation, the modeller can continue to largely think in terms of the business-level objects involved in the modelling process, rather than disrupting his thinking process with low-level information about template parameters, their types, etc. In the invention system, the templates as well as the inquiries are presented graphically, and as complete English sentences, making it easily readable for the modeller.

In a preferred embodiment, a computer method and system of generating inquires comprise:

(a) providing a plurality of templates, each template outlining a respective inquiry;
(b) enabling user selection and use of a template from the plurality, including enabling user-specification of values for parameters of the user selected template; and
(c) using the user selected template and user-specified parameter values, producing a query. For each template, the respective inquiry and/or template is associated with one or more semantic types, and each template has one or more parameters for defining a query instance of the respective inquiry. Preferably, for each template, the respective inquiry is associated with semantic types during template construction.

The invention method and system operates or may otherwise be applied during modeling of a certain domain, and the produced query is for information about the certain domain. During modeling, the user selects a semantic type in context of the certain domain being modeled. In response the invention system provides the plurality of templates by filtering the plurality of templates and presenting to the user a subset of the templates most applicable to semantic type selected by the user in context of the certain domain being modelled.

The invention system and method include:

templatizing prior existing or other queries to create templates for the plurality; and for each resulting created template, associating the template with one or more semantic types. Preferably the semantic types are based on classes in an ontology.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Applicant's (assignee's) research team is developing a prototype tool called CRAFT (Collaborative Reasoning and Analysis Framework & Toolkit) which allows the creation of parameterized inquiry templates from already defined inquiries. An inquiry template can be instantiated for a new investigation by substituting values drawn from the new investigation model for the corresponding parameters in the template. Templates are associated with user-specified semantic contexts at the time of template creation. The subject tool or system (CRAFT) 100 (FIG. 11) assists in the creation of templates by suggesting possible parameters, and semantic contexts in which a template could be used. During modeling, an inquiry catalog of the system 100 provides a dynamic view of applicable inquiry template suggestions based on the semantic information of the modeled objects which are selected in the workspace. When a template is applied in the context of a user-selected semantic entity, the invention system 100 replaces the template parameters by drawing values from the current model, creating a seamless and non-disruptive way to add inquiries.

Figure 1B:
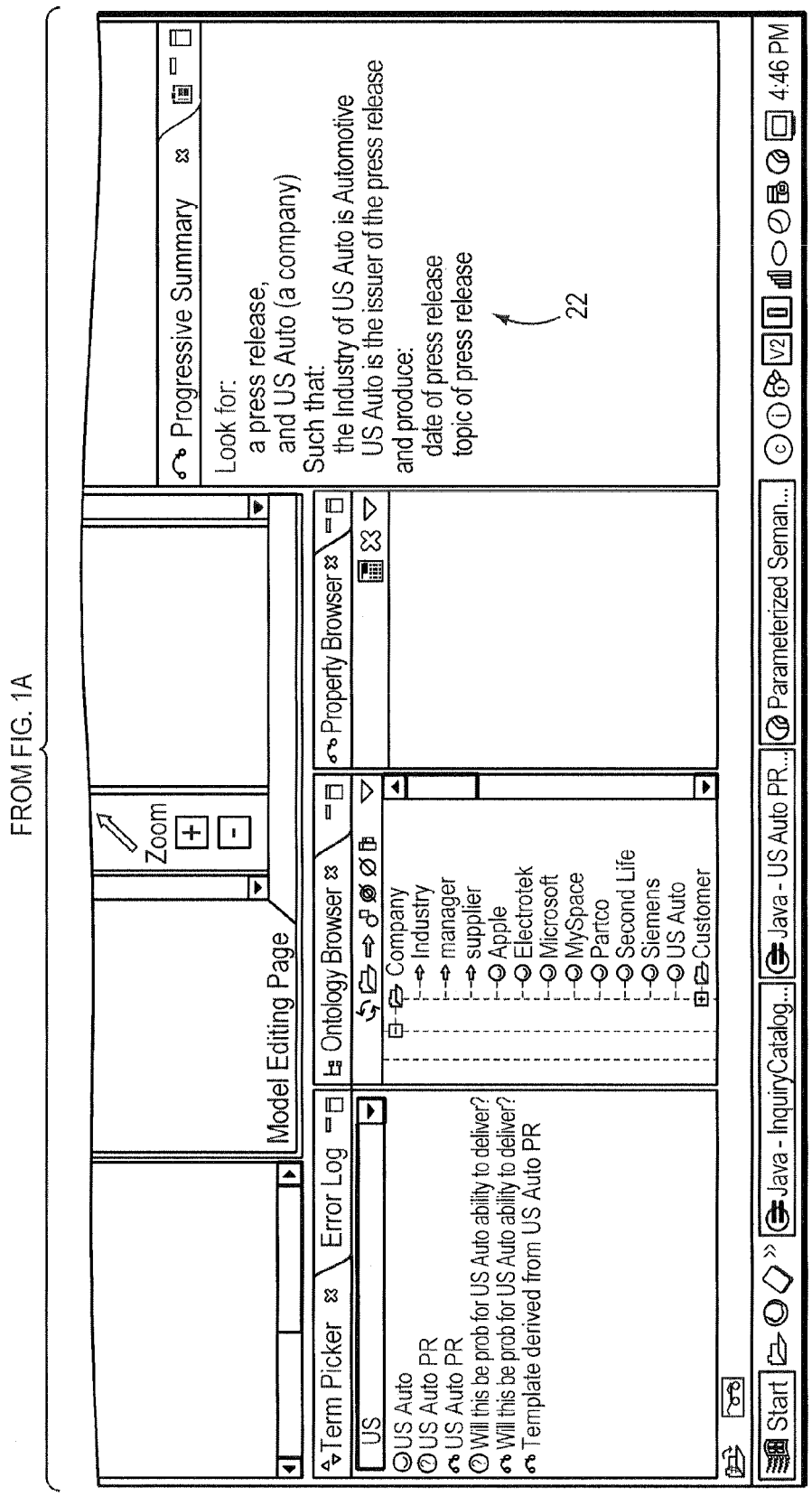
FIG. 1 is a schematic view of a modeling workspace and Graphical User Interface (GUI) in a computer tool system employing embodiments of the present invention.

Inquiries in the present invention system 100 are specified using a graphical semantic workspace 13 illustrated in FIG. 1. An inquiry catalog 15 provides a view or listing of previously constructed inquiries. The screen shot in FIG. 1 graphically represents or shows an inquiry 21 to find Press Releases 17 of a company in the Automotive Industry, called "US Auto" 19. It is noted and emphasized that the images and descriptions herewith are just one possible embodiment of the invention.

In embodiments, a graphical description of the inquiry 21 is supplemented by a progressive summary 22 (see lower right corner) that reads out the inquiry in English. The progressive summary may be implemented as described in U.S. patent application Ser. No. 12/017,987, entitled "Computer Method and Apparatus for Graphical Inquiry Specification with Progressive Summary," by assignee and herein incorporated by reference.

The graphical workspace 12 for inquiries is designed to closely resemble the workspace in which the models are constructed. This is accomplished by common ontology, common operations on/with elements (common graphical representations of elements, elements names and corresponding data) and common visual presentation (layout) of work areas (ones for constructing models and ones for constructing inquires). Further example details are found in U.S. patent application Ser. No. 11/867,890, entitled "A Method and Apparatus for Providing On-Demand Ontology Creation and Extension," and U.S. patent application Ser. No. 12/017,990, entitled "Computer Method and System for Contextual Management and Awareness of Persistent Queries and Results," all by assignee and incorporated by reference. Thus the modeler's workspace looks substantially similar to FIG. 1. Notice how there are already many inquiries in the Inquiry Catalog View 15 (on the right hand side). Selecting an appropriate one to copy and modify to suit the current modeling context is a non-trivial task and defocuses the attention of the modeler from the task of modeling.

How to create a template:

Old or prior existing inquiries such as US Auto PR 21 can be used as starting points for future templates. Factors which are specific to this inquiry 21 are converted into parameters. When applied in a new context, new values need to be specified for the parameters.

Note that the act of creating a template is distinct from the act of using a template. Indeed, it is often the case that the users who create new templates are different from the users who use the template within the context of their modelling activity. Creating a template is a first-class activity that happens outside the context of the modelling process, and thus, finding the right inquiry to templatize is not an issue. In typical usage, new inquiries that had to be created from scratch during modelling process are templatized at the conclusion of that modelling effort, to make future modelling easier.

Figure 2:
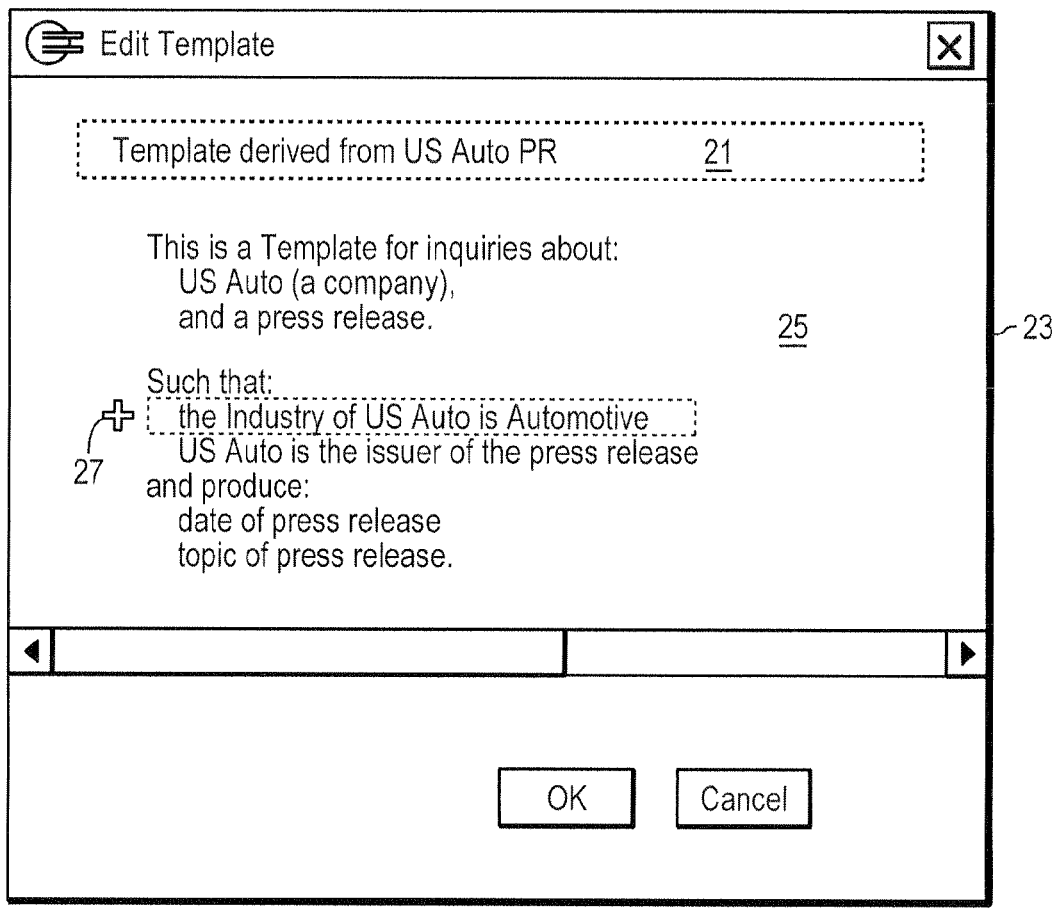
FIG. 2 is a schematic view of a dialogue box for templating an inquiry according to the present invention, employed in the Graphical User Interface of the computer tool system of FIG. 1.

To templatize a concrete inquiry in one embodiment, a user initiates command (e.g., right click) in the Inquiry Catalog View 15 and selects (clicks) function or operation option "Templatize This!" 33. The dialog screen 23 of FIG. 2 results and shows that the inquiry "US Auto PR" 21 is being templatized. The dialog 23 displays a summary 25 of the inquiry 21. Possible places where the inquiry can be parameterized are identified by a green plus sign 27 or other symbol, mark, etc. One implementation identifies attributes of individual entities (such as the Industry of US Auto) as candidates for parameterization. The other kind of sentence in the "such that:" section shows relationships 11 between entities (eg: US Auto is the issuer of the press release) which are represented as arrows in the graphical display of the inquiry 21 in FIG. 1. Since the user is likely to be trying to templatize the specific graph pattern of the arrows 11 in the graphical view of FIG. 1, the invention system 100 does not offer the drawn relationships for parameterization. In other words, in common usage, the user is unlikely to want to change what is shown in the arrows (relationships 11).

Once candidate parameters are identified, each parameter is made as an optional or required parameter and also is given a default value.

Figure 3:
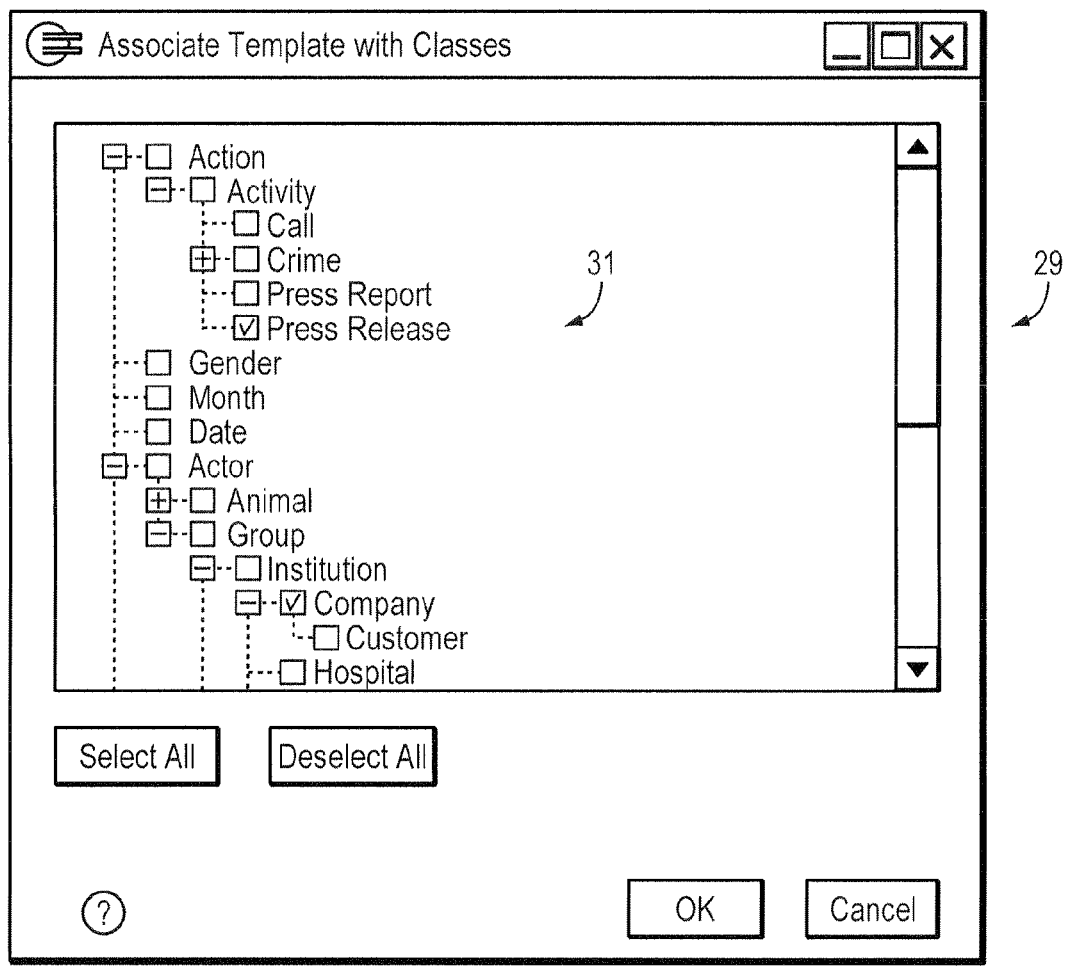
FIG. 3 is a schematic view of associating semantic type or context with inquiry templates in embodiments of the present invention in the computer tool system of FIG. 1.

Once the parameters have been identified and configured as above, the user is prompted 29 to associate the template with semantic contexts where the template can be applied (FIG. 3). In the invention system 100, this context 31 is determined by classes in the system ontology. In the illustrated example, system 100 assists the template creator by inferring and automatically suggesting associations with Press Release (because the inquiry produces the date and topic of the press release as output) and Company (because the parameter "Industry" is an attribute of the Company type and "US Auto" in the old inquiry is of type Company). However, the user may want to make additional associations. For instance, whether a company has hired a new CEO could be ascertained by scanning the topics of their press releases. Thus, the inquiry which finds the date+topic of the press release of the company can be useful in the context of the "CEO" semantic type. So the user would select from semantic contexts 31 the "CEO" type.

Figure 4:
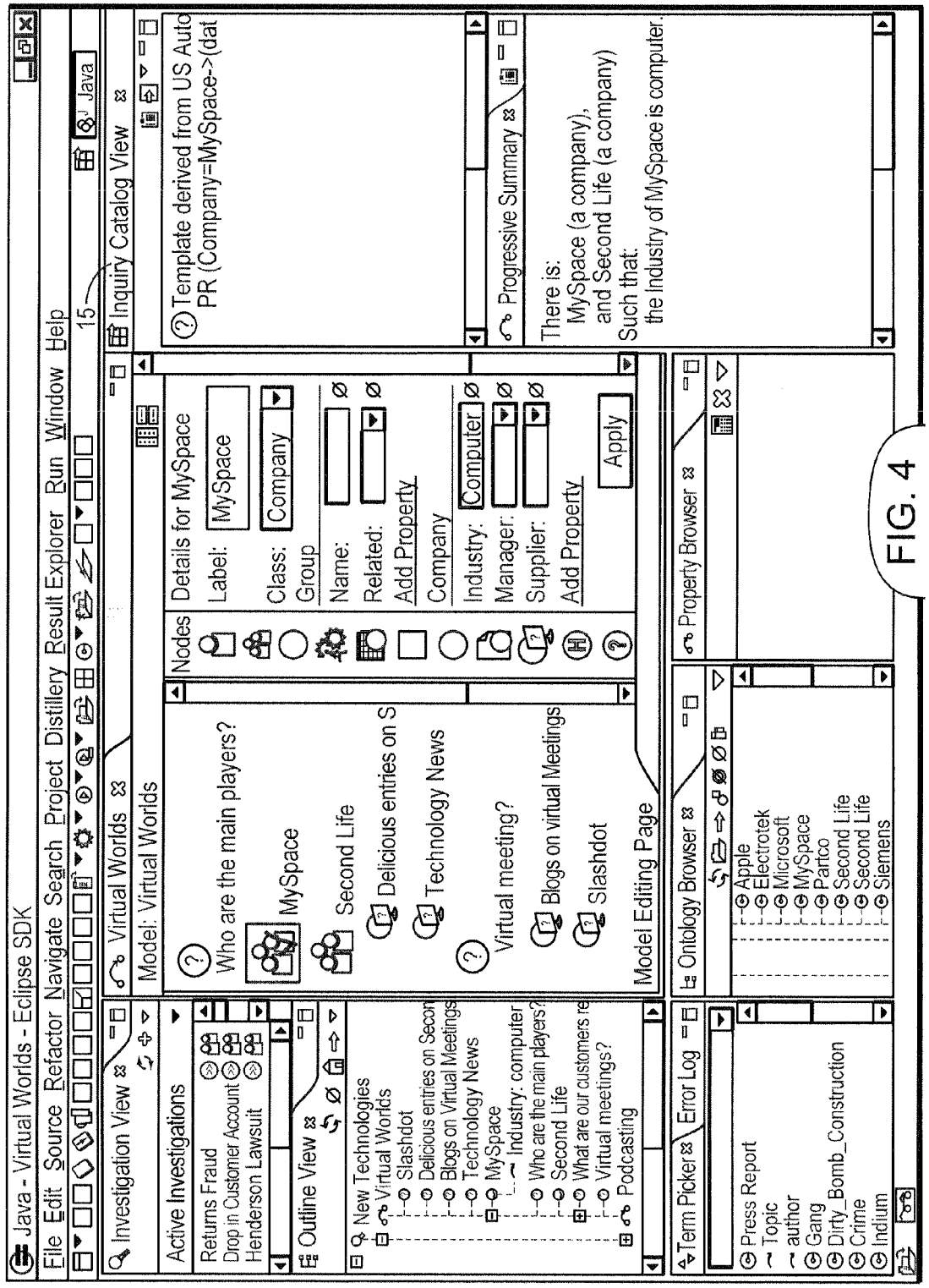
FIG. 4 is a schematic view of the invention inquiry templates and Inquiry Catalog tied to an example company ontology context.

During modeling the Inquiry Catalog can be filtered to show only the templates relevant in the context of objects which are selected in the semantic workspace. In one embodiment, this is accomplished by initiating command (right clicking) in the Inquiry Catalog View 15 and selecting the "Tie Catalog to Ontology" option 35 shown in FIG. 1. A supporting function or operation is responsive, and the associations entered in FIG. 3 above are used to determine which templates are applicable. FIG. 4 shows the Inquiry Catalog 15 when MySpace, a computer company has been selected (is the selected objects). Since MySpace is a Company, the template just created by the steps of FIGS. 1-3 will be applicable in the context of the selected object. Notice that the Inquiry Catalog 15 has detected that "MySpace" is the value to replace the input parameter (Company=Myspace). Also notice that all other inquiries and templates, which are not suitable in the context of the selected object, are hidden in the Inquiry Catalog 15 because the catalog has been tied to the current ontology context 31. These aspects of the invention help the modeller easily pick which template to use.

As can be seen from the above dialog 29 (FIG. 3), the classes in the Ontology are organized into a tree-like hierarchy of subtypes and supertypes. A class may have many super classes and can thus appear as a subtype of multiple classes. So the ontology is operationally a directed acyclic graph, but is depicted as a tree. Notice that for this inquiry, any subtype of Company can provide the required parameter. Thus, one can use a supertype and subtype hierarchy as well to provide additional context.

Figure 5:
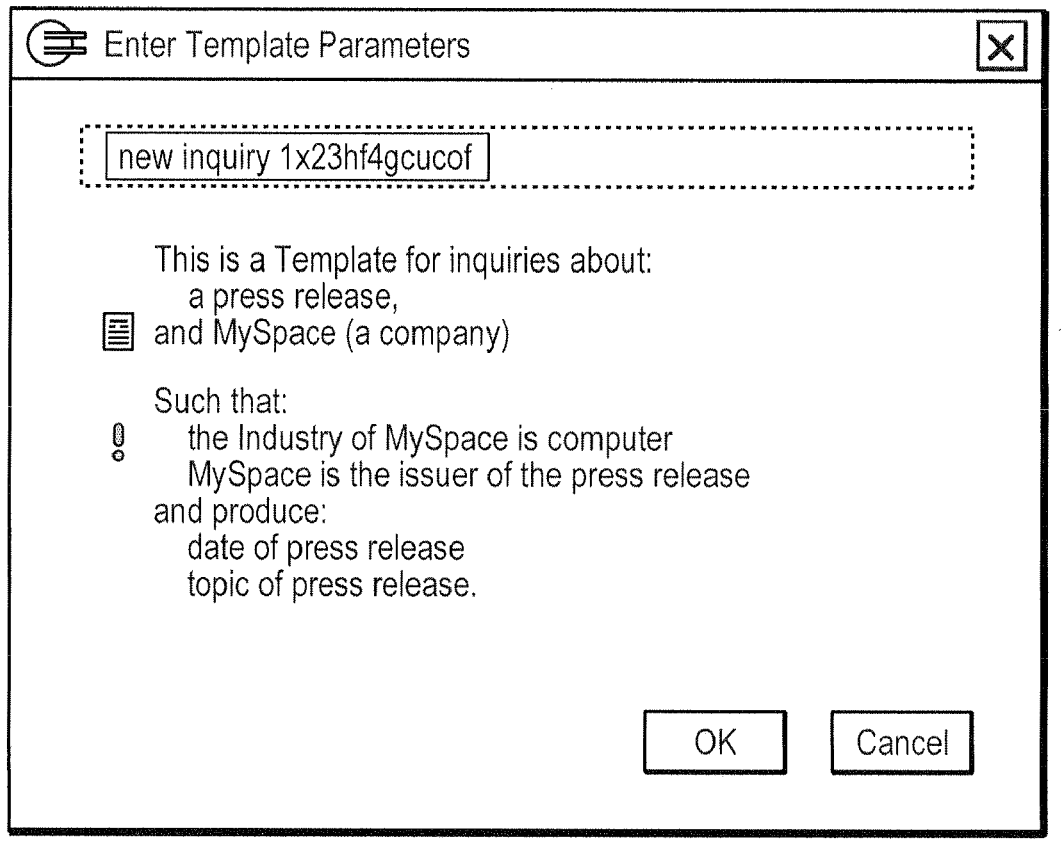
FIG. 5 is a schematic view of a dialog window in the present invention prompting the user to enter a parameter or accept the default parameters automatically filled-in based on the current semantic context.

To create a new inquiry (specific query instance) based on a template listed in Inquiry Catalog 15, the user drags the list entry corresponding to or otherwise representing the template from the catalog 15 into the graphical editor space 13 (FIG. 1). In response, system 100 opens up a dialog window 57 (FIG. 5) prompting the user to enter values for the various parameters of the template. One example parameter is "the Industry of MySpace is computer" in the illustrated example, or generally the parameter "the industry of <the-company> is . . . " Notice that all parameters have already been filled-in based on the current semantic context (e.g., MySpace). In the default case, the user only has to operate the OK button (or equivalent) in order to create a new inquiry (query instance) in FIG. 5.

For comparison, the template would look as follows if the parameters were not filled in:

This is a Template for inquiries about:
   a press release
   A Company

Such that
   the Industry of the Company is * (computer)
   the Company is the issuer of the press release Producing
   the date of the press release
   the title of the press release The parameterizable parts are italicized and underlined. The * (asterisk) prefix shows that the parameter is required, and the default value (computer) is shown in parenthesis. Optional parameters may be prefixed by a "?" or other mark, symbol, indicator, etc.

Figure 6:
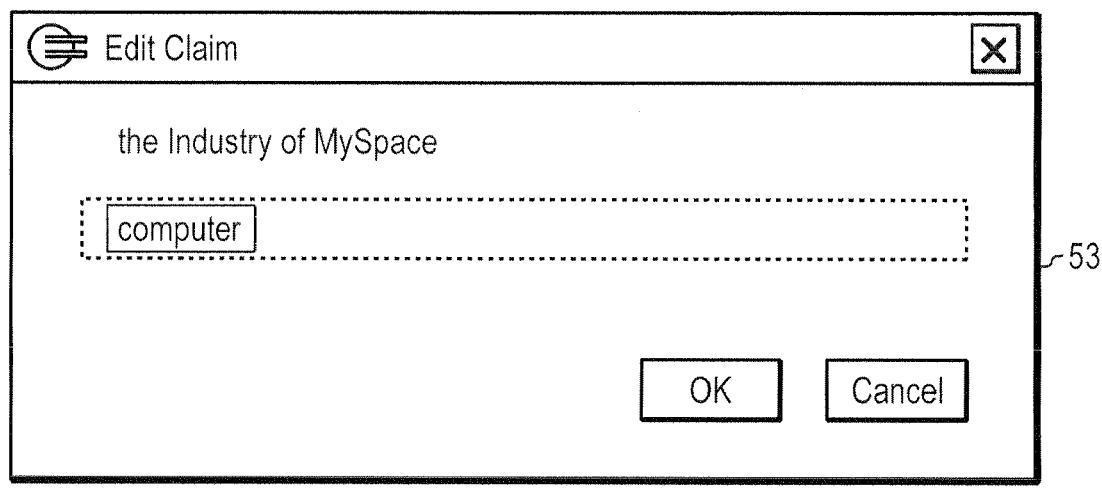
FIG. 6 is a schematic view of a dialog box allowing a user to edit a claim (e.g. editing a statement) in the present invention.

Users can edit each parameter separately by double-clicking on them. Required parameters are identified by a red exclamation icon, and optional parameters have a similar icon (a right-pointing arrow in yellow for example). This brings up a dialog box 53 (FIG. 6) which allows the user to enter a new value for the "such that" statement being edited. In illustrated example, the user is prompted for "the Industry of Myspace".

Figure 7:
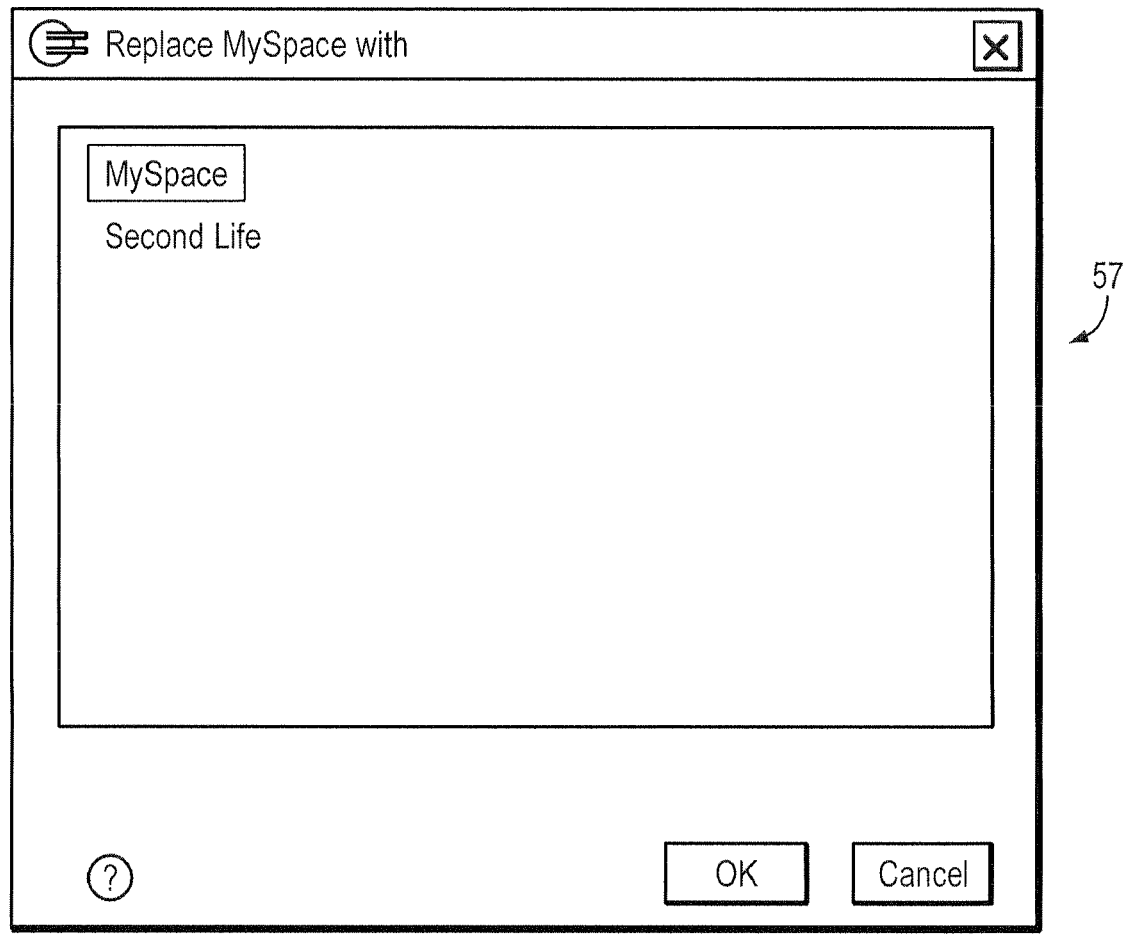
FIG. 7 is a schematic view of a dialog box allowing a user to substitute a new value for a parameter in a template in the present invention.

In an alternate way to replace parameters with actual entities, users replace the templatized object (the Company) with another company from the model. FIG. 7 illustrates one such implementation of this replace operation 57. Other implementations are suitable. When a whole object is replaced, all relevant "such that" statements with parameters are automatically updated with values drawn from what is known about the replacing object in the model.

For example, if "MySpace" as company object was replaced with "SecondLife" and in the model, the user had entered the Industry of SecondLife as "Virtual Worlds", the relevant required parameter would automatically be updated and the inquiry would look as follows (the changes are italicized for purposes of illustrating the automatic updating feature):

This is a Template for inquiries about:
   a press release
   SecondLife (a Company)

Figure 8:
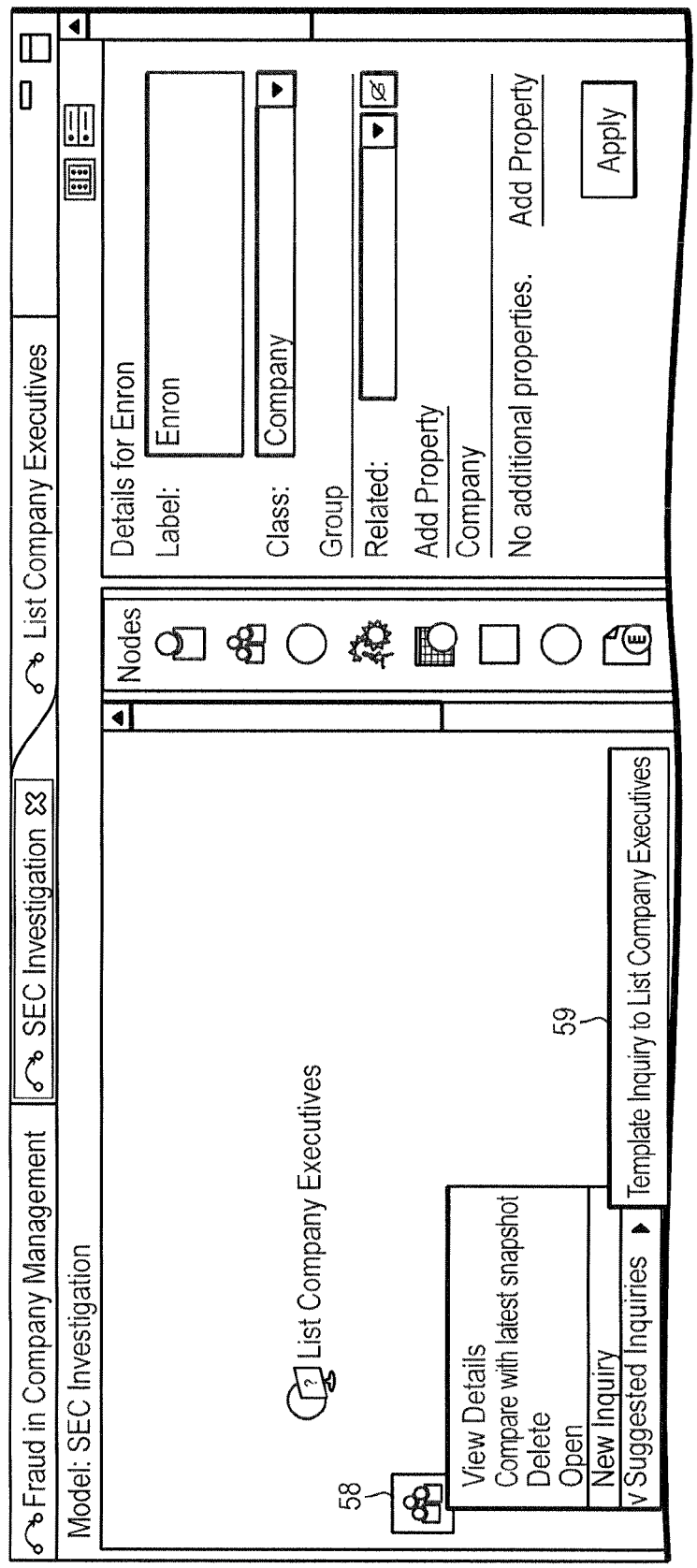
FIG. 8 is a schematic illustration of the present invention suggesting an inquiry to a modeler-user allowing the modeler-user to think in terms of the objects being modeled instead of the low level attributes of the objects.

Such that
   the Industry of SecondLife is Virtual Worlds
   SecondLife is the issuer of the press release Producing
   the date of the press release
   the title of the press release The invention system 100 also provides a second way for the modeler to create new inquiries or queries (query instances) from templates. Rather than looking at the inquiry catalog 15, the modeler can right-click on (or otherwise indicate) the items being modeled and inquiries that are applicable (have matching classes) are suggested as options. FIG. 8 shows a model of an SEC Investigation, and an inquiry 59 is being suggested for a node 58 of type (class) Company, labeled "Enron". Based on class type of the user-selected modeled item 58 matching the semantic context class(es) associated with inquiry templates (from template creation in FIG. 3), the invention system 100 determines templates/inquiries from catalog 15 to suggest.

In summary, the present invention allows the modeler to think in terms of the objects being modeled ("MySpace" and "Second Life") rather than in terms of the objects' low-level attributes. While the inquiry 21 shown here is quite simple for pedagogic reasons, the present invention can significantly simplify the creation of a new inquiry. For instance, suppose the inquiry depended on the industry of the company, the NYSE ticker tape symbol as well as the number of employees, then all these parameters could be changed simultaneously, simply by changing the object being used as input parameter.

Figure 11:
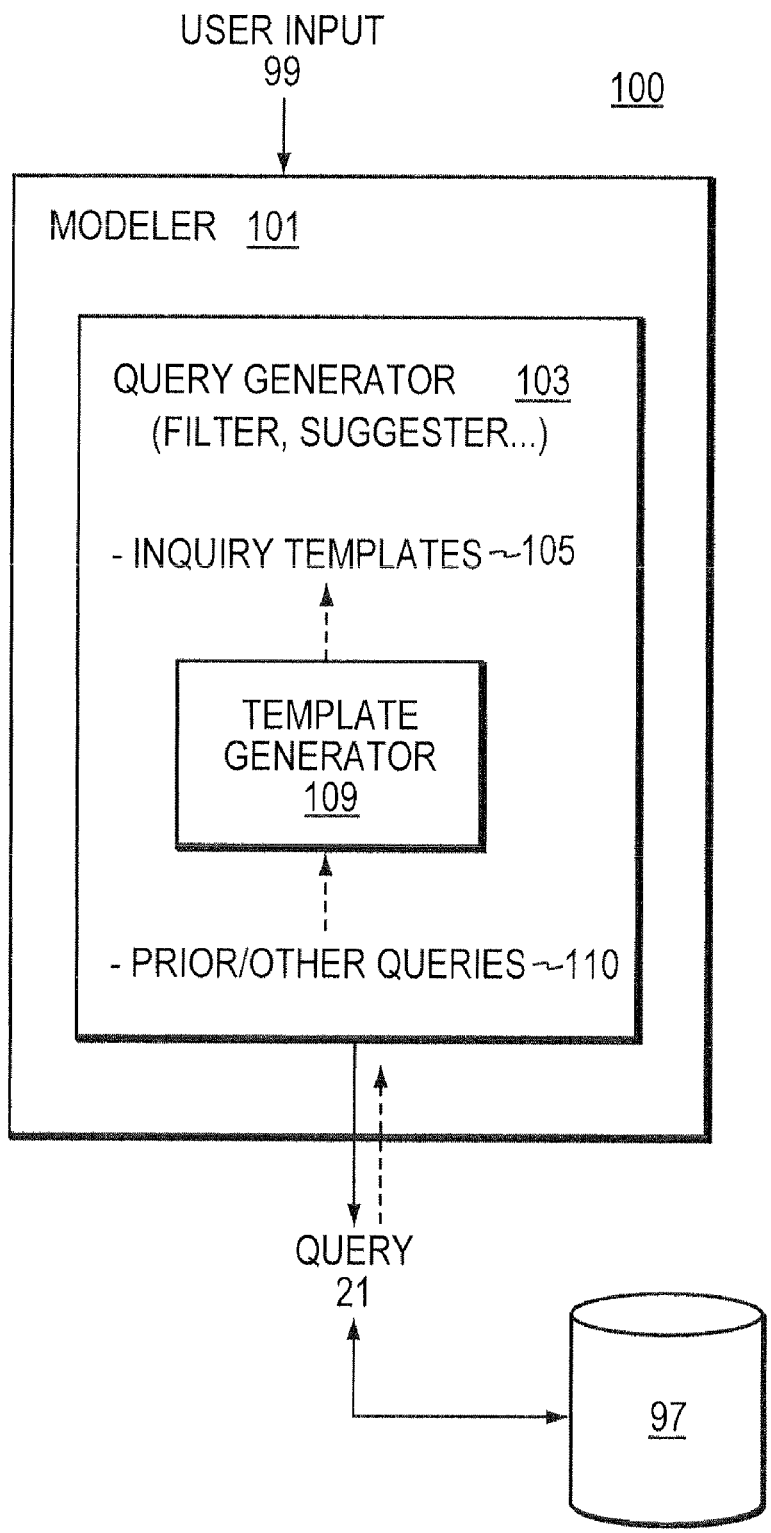
FIG. 11 is a block diagram of a preferred embodiment of the present invention.

According to the forgoing, one embodiment of the invention system 100 is formed of a modeling module or modeler 101 and a query generator 103 as depicted in FIG. 11. The modeler 101 models a problem domain as mentioned above and further detailed in the related patent applications. The query generator 103 provides a plurality of templates 105 outlining inquiries for model-users use. Each template at 105 has a respective inquiry and is associated with one or more semantic types or context. The association is preferably made during or as part of template creation. Each template's respective inquiry has one or more parameters as described above.

Use of a template 105 during modeling in 101 is then as follows. User input 99 selects a template 105 for use and specifies parameter values resulting in a generated query instance 21 of the selected template inquiry. The model 101 context is used to automatically specify parameter values as a default as described above in FIGS. 4 and 5. In some embodiments, the query generator 103 enables individual and global (batch or multiple location) changes to parameter values as discussed in FIGS. 6 and 7. The generated query 21 is applied to one or more data sources 97 which may include streaming data, various databases, and the like. Results of the query search are provided to the model-user of modeler 101.

With regard to template creation (construction), the query generator 103 employs a template generator 109 that creates the templates 105. The template generator 109 operates as described above in FIGS. 1-3 including templatizing and parameterizing prior or other queries 110. The template generator 109 cooperates with the user modeling of an inquiry (such as 21 in FIG. 1) in modeler 101. Preferably this includes using a common user interface paradigm between the problem domain modeling and the inquiry modeling, and using the same ontology and context between the problem domain modeling and the inquiry modeling. As such, the semantic types associated with an inquiry template 105 constructed or otherwise created by generator 109 are classes (including subclasses and superclasses) of the ontology of the modeling domain.

Further, during template use in operation of modeler 101, associating or otherwise effectively indexing the inquiry templates 105 by semantic types (classes) enables presentation of the plurality of templates 105 to be filtered based on semantic type or context of the current model (problem domain modeling) as discussed above. Also such associating by semantic types or context enables the suggestion feature (suggester) as a function of model domain context as described in FIG. 8.

Figure 9:
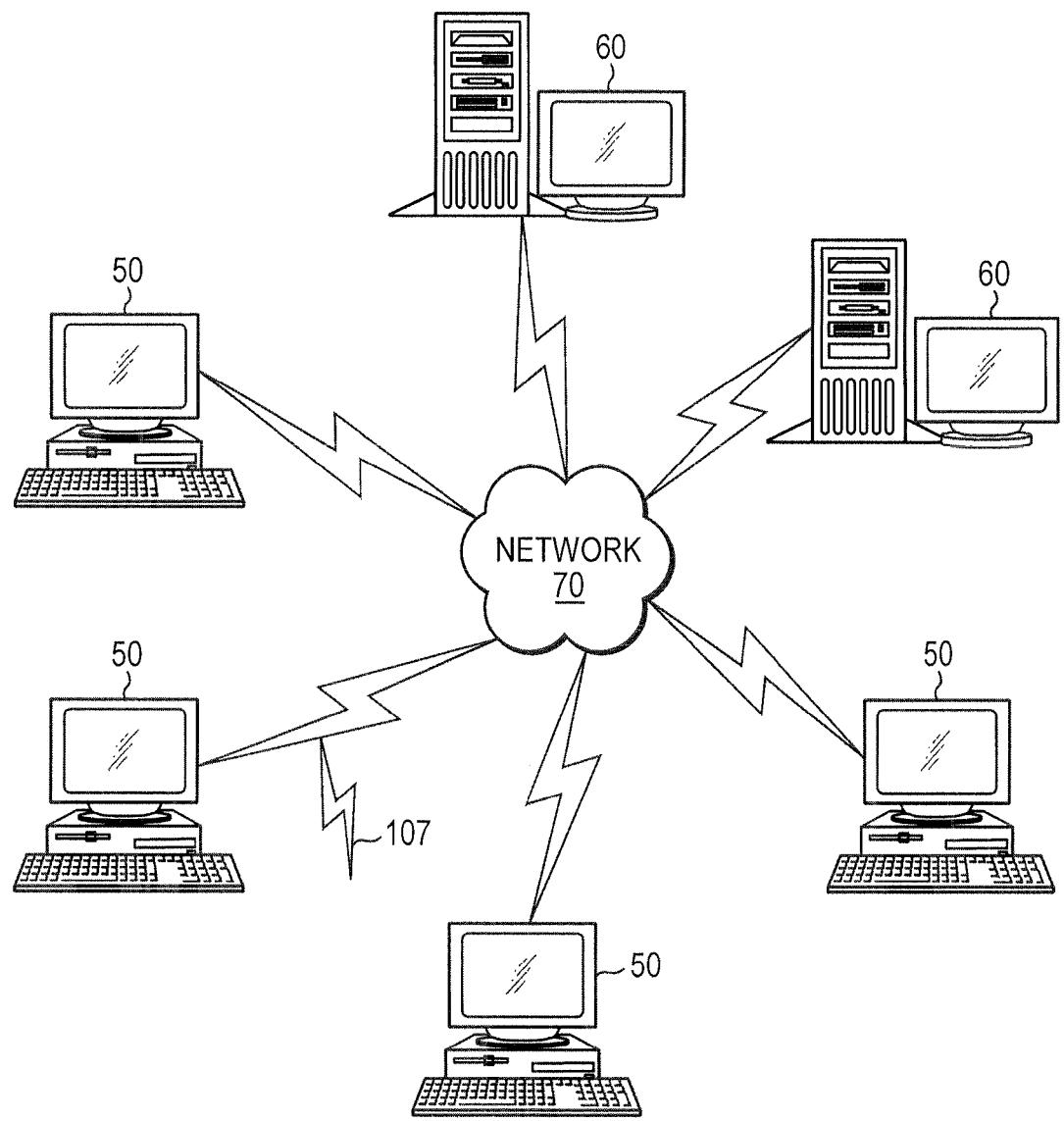
FIG. 9 is a schematic view of a computer network in which embodiments of the present invention may be implemented.

FIG. 9 illustrates a computer network or similar digital processing environment in which the present invention may be implemented. Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 10:
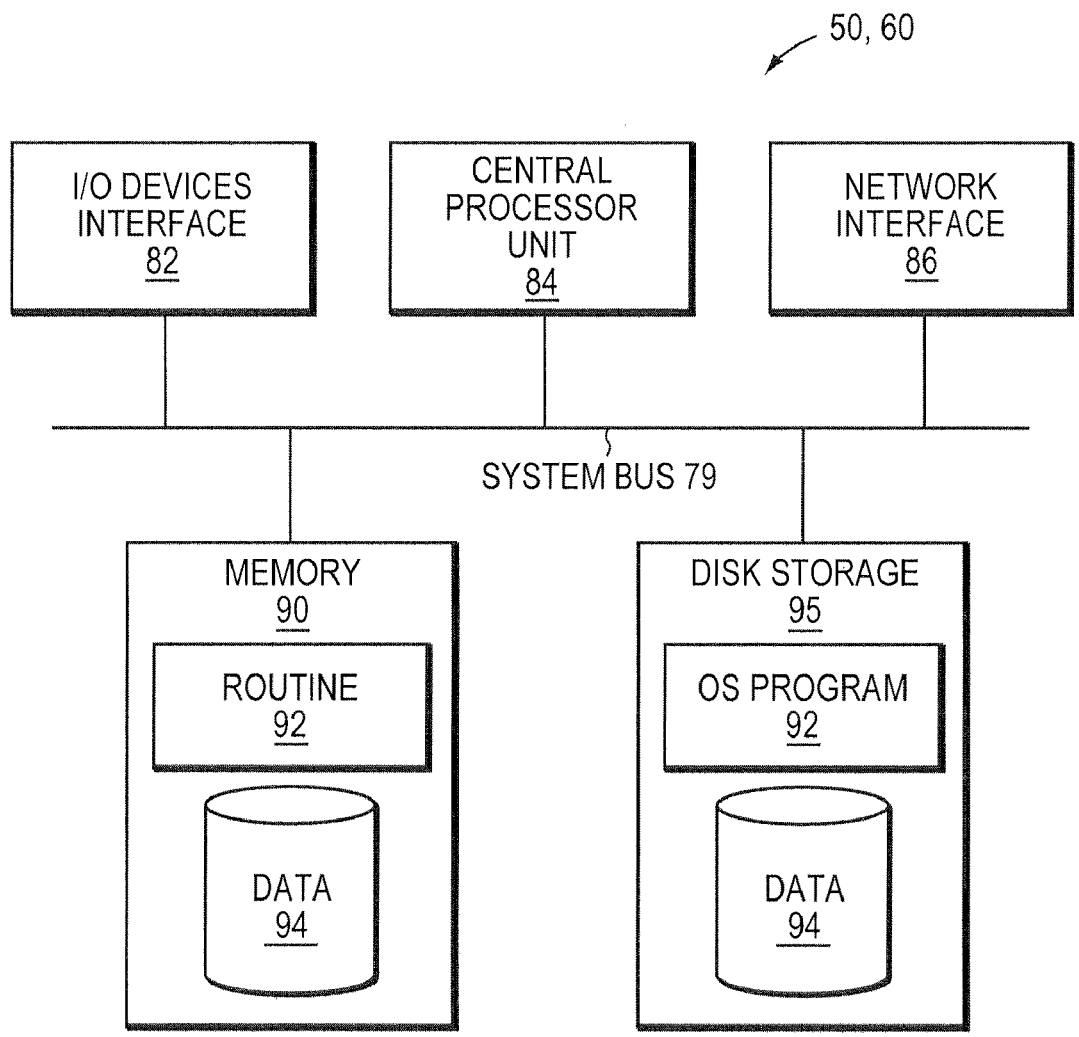
FIG. 10 is a block diagram of a computer node in the network of FIG. 9.

FIG. 10 is a diagram of the internal structure of a computer (e.g., client processor/device 50 or server computers 60) in the computer system of FIG. 9. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 9). Memory 90 provides volatile storage for computer software instructions 92 and data 94 used to implement an embodiment of the present invention (e.g., modeler 101, inquiry templates 105, query generator 103, template generator 109 and filter, suggester and other features detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While this invention has been particularly shown and described with references to example embodiments thereof, it will be understood by those skilled in the art that various changes in form and details may be made therein without departing from the scope of the invention encompassed by the appended claims. For example, the computer architecture of FIGS. 9 and 10 are for purposes of illustration. Other computer architectures and/or configurations are suitable.

What is claimed is:

1. A computer method of generating inquires comprising:
given a computer-based modeler modeling an investigation of a subject problem, the computer-based modeler being executed by a computer and generating an investigation model, and the investigation model having a respective domain, different investigations modeled by the computer-based modeler having different respective domains;
providing to the computer-based modeler a plurality of templates, each template outlining a respective inquiry and being associated with one or more semantic types, and each template having one or more parameters for defining a query instance of the respective inquiry;
enabling user selection and use of a template from the plurality, including enabling user-specification of values for parameters of the user selected template; and
using the user selected template and user-specified parameter values, producing a query relevant to the investigation being modeled by applying the template in context of the investigation model and respective domain such that the produced query is for information about the investigation of the subject problem.

2. The method as claimed in claim 1, wherein for each template, the template and/or respective inquiry is associated with semantic types during template construction.

3. The method as claimed in claim 1, wherein the step of providing a plurality of templates includes during modeling, filtering the plurality of templates and presenting to the user a subset of the templates most applicable to semantic type selected by the user in context of the respective domain of the investigation model.

4. The method as claimed in claim 1, wherein the step of providing a plurality of templates includes:
   templatizing prior existing queries to create templates for the plurality; and
   for each created template, associating the template with one or more semantic types.

5. The method as claimed in claim 4, wherein the semantic types are based on classes in an ontology.

6. The method as claimed in claim 1, wherein the semantic types are based on classes in an ontology.

7. Computer apparatus for generating inquires comprising:
   a computer-based modeler modeling an investigation of a subject problem, the computer-based modeler being executed by a computer and generating an investigation model, and the investigation model having a respective domain, different investigations modeled by the computer-based modeler having different respective domains;
   a query generator executed by a processor and providing a plurality of templates to the computer-based modeler, each template outlining a respective inquiry and being associated with one or more semantic types, and each template having one or more parameters for defining a query instance of the respective inquiry;
   the query generator being responsive to user input selecting a template from the plurality, the user input including user-specification of values for parameters of the selected template, and the
   query generator responsively producing a query that (i) is relevant to the investigation being modeled and (ii) has the user specified parameter values in context of the respective domain of the investigation model, wherein the produced query is for information about the investigation of the subject problem being modeled.

8. Computer apparatus as claimed in claim 7, wherein for each template, the template is associated with semantic types during template construction.

9. Computer apparatus as claimed in claim 7, further comprising a filter, wherein during modeling, the filter provides a subset of the templates most applicable to semantic type selected by the user in context of the respective domain of the investigation model.

10. Computer apparatus as claimed in claim 7, further comprising a template generator, the template generator forming templates for the plurality by templatizing existing queries to create respective templates for the plurality; and
   for each created template, associating the template with one or more semantic types.

11. Computer apparatus as claimed in claim 10, wherein the semantic types are based on classes in an ontology.

12. Computer apparatus as claimed in claim 7, wherein the semantic types are based on classes in an ontology.

13. A computer system for generating inquiries comprising:
   a processor;
   template means executable by the processor and providing a plurality of templates to a computer-based modeler modeling an investigation of a subject problem, the computer-based modeler being executed by a computer and generating an investigation model, and the investigation model having a respective domain, different investigations modeled by the computer-based modeler having different respective domains, each template outlining a respective inquiry and being associated with one or more semantic types, and each template having one or more parameters for defining a query instance of the respective inquiry;
   user input means for enabling user selection and use of a template from the plurality, including enabling user-specification of values of parameters of the user selected template; and
   query generation means coupled to the processor and responsively producing a query instance using the user selected template and user-specified values in context of the respective domain of the investigation model, such that the produced query instance queries information about the subject problem.

14. A computer system as claimed in claim 13, wherein the template means includes a template generator for templatizing existing queries and creating therefrom templates for the plurality.

15. A computer system as claimed in claim 14, wherein the template generator, for each created template, associates the template with one or more semantic types.

16. A computer system as claimed in claim 13, wherein the semantic types are based on classes in an ontology.

17. A computer program product comprising a computer usable storage medium having a computer readable program embedded therein, wherein the computer readable program when executed by a digital processor causes:
   a plurality of templates to be provided to a computer-based modeler modeling an investigation of a subject problem, the computer-based modeler being executed by a computer and generating an investigation model having a respective domain, different investigations modeled by the computer-based modeler having different respective domains, each template outlining a respective inquiry and being associated with one or more semantic types, and each template having one or more parameters for defining a query instance of the respective inquiry;
   user selection of a template from the plurality to be enabled, including enabling user-specification of values for parameters of the user selected template; and
   the user selected template and user-specified values to be used in context of the respective domain of the investigation model to produce a query, wherein the produced query queries information about the subject problem.

18. A computer method of generating a query in context of a model, comprising:
   given a computer-based modeler modeling an investigation of a subject problem, the computer-based modeler being executed by a computer and generating an investigation model, and the investigation model having a respective domain, different investigations modeled by the computer-based modeler having different respective domains;
   obtaining from memory storage a prior existing inquiry formed of query specific factors;

converting the prior existing inquiry into a template by converting at least one of the query specific factors into respective parameters, the template providing the respective parameters for defining a query;

associating the template with one or more semantic types; and enabling subsequent user selection of the template and specification of the template parameters in context of the investigation model and the respective domain to generate an instance of the query defined by the parameters of the template, the generated instance of the query being relevant to the investigation model and querying information about the subject problem.

19. A computer method as claimed in claim 18 wherein the step of converting further includes:

for each respective parameter of the template, further defining the parameter as one of optional and required; and defining default values for the respective parameters.

* * * * *